United States Patent [19]
Reynolds et al.

[11] 3,753,146
[45] Aug. 14, 1973

[54] NOVEL VISIBLE SPECTRUM DYE LASERS
[75] Inventors: George A. Reynolds; Sam A. Tuccio; Otis G. Peterson; Donald P. Specht, all of Rochester, N.Y.
[73] Assignee: Eastman Kodak Company, Rochester, N.Y.
[22] Filed: Oct. 18, 1971
[21] Appl. No.: 190,304

Related U.S. Application Data
[63] Continuation of Ser. No. 15,489, March 2, 1970, abandoned.

[52] U.S. Cl............................. 331/94.5, 252/301.3
[51] Int. Cl............................................. H01s 3/20
[58] Field of Search................. 331/94.5; 252/301.2, 252/301.3

[56] References Cited
FOREIGN PATENTS OR APPLICATIONS
1,082,359  9/1967  Great Britain.................... 331/94.5

OTHER PUBLICATIONS
Snavely et al., Blue Laser Emission From a Flashlamp—Excited Organic Dye Solution. Appl. Phys. Letters, Vol. 11, No. 9 (Nov. 1, 1967) pp. 275–276.
Schafer et al., Organic Dye Solution Laser. Appl. Phys. Letters, Vol. 9, No. 8 (Oct. 15, 1966) pp. 306–309.
Soffer et al., Continuously Tunable, Narrow–Band Organic Dye Lasers. Appl. Phys. Letters, Vol. 10, No. 10 (May 15, 1967) pp. 266–267.
Spaeth et al., Stimulated Emission From Polymethine Dyes. Appl. Phys. Letters, Vol. 9, No. 5 (Sept. 1, 1966) pp. 179–181.

Primary Examiner—William L. Sikes
Attorney—W. H. J. Kline et al.

[57] ABSTRACT
A lasing medium is disclosed containing certain pyrylium and benzopyrylium organic dyes which are capable of laser emission in the 500–600 nanometer region.

13 Claims, 3 Drawing Figures

PATENTED AUG 14 1973 3,753,146
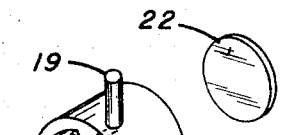
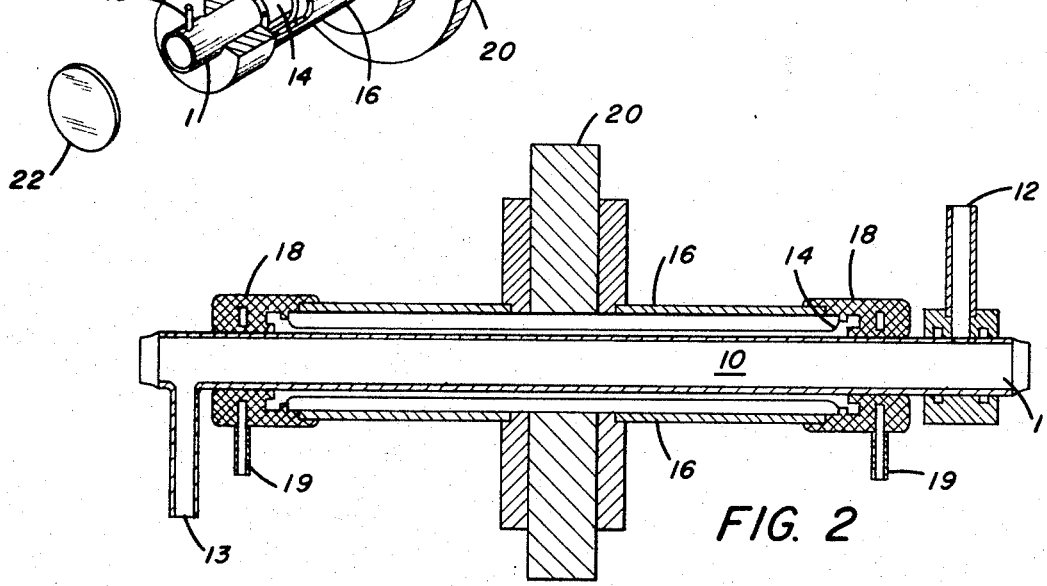
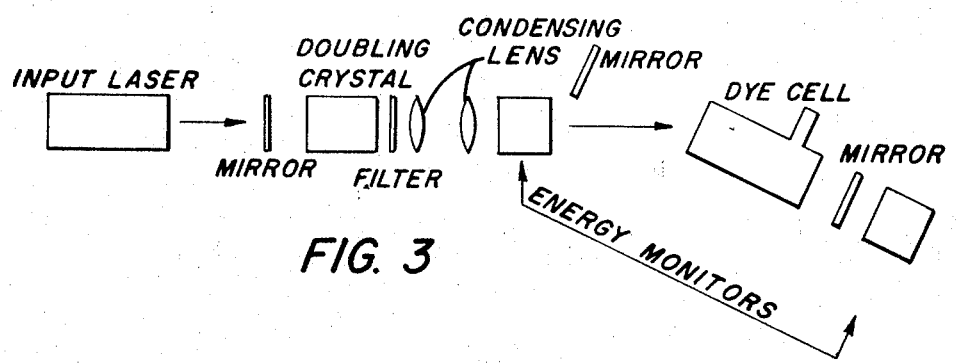
GEORGE A. REYNOLDS
SAM A. TUCCIO
OTIS G. PETERSON
DONALD P. SPECHT
INVENTORS
BY J. Wm. Berhustussen
ATTORNEY

NOVEL VISIBLE SPECTRUM DYE LASERS

This is a continuation of application Ser. No. 15,489, filed Mar. 2, 1970 now abandoned.

This invention relates to improved organic dye lasers and to the use of certain pyrylium and benzopyrylium organic dyes which are capable of lasing, when properly excited, with useful emission in the 500–600 nanometer region.

In the past few years, the term "laser" (acronym for light amplification by stimulated emission of radiation) or "optical maser" (acronym for microwave amplification by stimulated emission of radiation) have become quite well known. Basically, a laser, or if you like, an optical maser, is a device wherein a radiation-responsive material is excited by externally applied energy to produce a beam of coherent radiation of high-intensity and extremely narrow optical band-width. This output radiation or emission is referred to as a "laser beam." When "pumped" electrons within the lasing material absorb energy and are excited temporarily from the normal "ground" state to higher energy states. However, the electrons quickly return to the ground state releasing energy. The release of absorbed pumping energy is in the form of photons (quanta of light). A photon emitted spontaneously in this manner can trigger other excited electrons to return to the ground state and emit photons prematurely. This process is called "stimulated emission." If enough electrons within the lasing material have been excited to higher energy states by absorption of pumping energy, the stimulated emission process will result in an avalanche effect.

By means of mirrors, the emitted photons are reflected back and forth through the lasing medium to increase this avalanche effect which then builds in intensity and produces the desired laser beam. In the past several years, lasers have gained considerably in importance. Sharply focused laser beams can produce power levels capable of drilling, welding and cutting in some of the hardest materials known. The optical band width and extremely small dispersion of laser beams can provide the field of communications with a vast new information-carrying capacity. Further, properly collimated laser beams have proven to be useful tools for providing extremely accurate measurement, alignment, monitoring, etc., in many areas of science, technology and medicine.

A wide variety of elements in atomic, ionic and molecular combinations ranging from gases and rare earths to organic dyes have been used successfully as lasing materials. These lasing materials have been used with various "host" materials which are transparent to the particular wavelengths of radiation absorbed and emitted by the particular lasing material which is intermingled therein. Such lasing media have been used successfully in the form of gases, solids and liquids to produce laser beams of many different wavelengths. With increased commercial activity, there is great demand for economical lasers capable of delivering higher powers with greater efficiency and greater selectivity of emission radiation than has previously been possible.

It is in this latter regard that the particular organic dyes disclosed hereinafter have particular utility. In particular, it is desirable that the laser emission be in a useful region and tunable over a range greater than 10nm and that the active material be capable of being contained in a liquid host which is useful for high power applications.

According to the present invention, therefore, lasers are provided containing within the lasing media organic dyes selected from the group consisting of pyrylium and benzopyrylium dyes having the following formula:

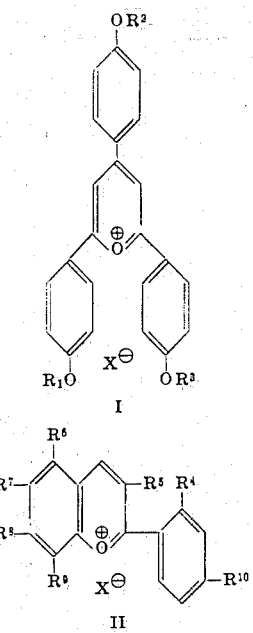

wherein each of $R^1$, $R^2$, and $R^3$ is an alkyl group having one to 12 carbon atoms, $R^4$ and $R^5$ are each hydrogen atoms, or taken together form a methylene chain having the structure $-(CH_2)-n$, wherein $n$ is an integer from 1 to 4; each of $R^6$, $R^7$, $R^8$, and $R^9$ is a hydrogen atom or one of the pairs of groups $R^6$ and $R^7$, $R^7$ and $R^8$, or $R^8$ and $R^9$ together form a 1,3-butadienylene group

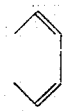

, while the remaining $R^6$, $R^7$, $R^8$, and $R^9$ groups are hydrogen atoms; $R^{10}$ is a hydrogen atom, an alkoxy group having one-six carbon atoms, an alkyl group having one-12 carbon atoms, or a dialkylamino group wherein each alkyl substituent of the dialkylamino group has one-four carbon atoms; and $X^\ominus$ is an acid anion. Preferably $R^1$, $R^2$ and $R^3$ contain more than four carbon atoms for improved solubility.

To obtain the desired emission from the hereinbefore described dyes the materials must be excited by a suitable source of energy such as illuminating it with a high energy light source as hereinbefore described. Suitable pumping sources include, for example, sources such as giant pulse lasers, xenon and argon arc flash tubes, as well as arc discharge tubes containing only air, or other gaseous mixtures.

Various arrangements of laser apparatus can be used. A laser structure particularly adapted for testing organic dye liquid laser medium was described by Sorokin et al, *IBM Journal*, Vol. 11, page 148 (1967). The laser apparatus structures usually used usually include a resonant cavity and a reservoir of liquid laser material. Typically, the reservoir is part of a closed system through which the dye solution is circulated during lasing operation. Thus, localized heating which can cause refractive discontinuities and potential breakdown of laser operation is effectively prevented. To provide energy for exciting the laser material, the laser body can be surrounded concentrically with a lamp containing an annular region within an inner and an outer transparent quartz cylinder. The annular region can contain an argon-air mixture and have electrodes which are operably connected to a low inductance capacitor charged by standard high voltage supply. Desirably, coaxially disposed in the resonant cavity are opposed internally reflective cavity ends such as mirrors.

Referring now to the drawings;

FIG. 1 is a partly sectioned perspective view of a typical dye laser.

FIG. 2 is a cross-sectional view of the cell in FIG. 1.

FIG. 3 is a schematic illustration of a laser pumping apparatus.

Referring now specifically to the drawings;

In FIG. 1 and 2, the dye cell 10 is shown provided with entrance tube 12 and exit tube 13 for introducing the dye solution into and out of the dye cell 10. The dye solution may be recirculated, if desired, by a reservoir and pump apparatus, not illustrated.

The dye cell 10 is surrounded with an alumina insulating tube 14. This insulating tube 14 is then surrounded with a conducting sleeve 16. An annular space is provided between the alumina insulating tube 14 and the dye cell 10. This annular space is the flashlamp discharge region of the laser. The space sealed by means of end flanges 18 which are equipped with a conduit 19 for communicating with the discharge region. The quartz tube 1 which defines the dye cell 10 is of course transparent to the radiation produced in the flashlamp discharge region. Discharge is anticipated by connecting the conducting sleeves 16 separated by insulator 20, to a suitable source of high voltage such as a high voltage, low inductance capacitor. The capacitor, not shown, is charged and as the flashlamp discharge region is evacuated a critical low pressure will be reached whereby an air spark is initiated within the flashlamp region. This high intensity flash illuminates the dye within the dye cell 10 and the resulting spontaneous radiation initiates the stimulated emission hereinbefore described, which is reflected between the mirror surfaces 22 producing the avalanche effect or lasing within the resonant cavity defined by the mirrors and containing the dye cell. A small portion of the radiation is transmitted through one of the mirrors 22 to produce the characteristic laser beam.

Further explanation of the working of typical dye lasers can be obtained from the article by Sorokin, Lankard, Moruzzi and Hammond, "Flashlamp-Pumped Organic-Dye Lasers," *Journal of Chemical Physics*, Vol. 48, No. 10, pages 4726-41 (1968).

In FIG. 3 a laser pumped system is schematically shown with the parts labeled. The exciting laser output is directed through a partially transmitting mirror to a doubling crystal through a filter to absorb the input laser fundamental, and then through the condensing lens, energy monitors and dye cell, as shown. Stimulated emission is produced within the dye cell by the reflections between the reflecting mirror faces located on either side of the cell. Two dielectric coated mirrors used in the dye laser cavity are each placed a fixed distance (5 cm) from each end of the dye cell. One mirror had a radius of curvature of 18 cm and a reflectivity of greater than 99 percent between 500 and 600 nm. The other mirror was flat with approximately 90 percent reflectivity in the same wavelength region. In use the dye laser cavity axis forms an angle of 25° with the pump axis as shown in the drawing. With this kind of set up, it is possible to monitor the energy input and output of the dye cell and thereby obtain confirmation of lasing activity.

The hereinafter described dyes of the present invention lase in solution when pumped by laser radiation as shown in FIG. 3. Additionally they can be used in laser apparatus such as shown in FIGS. 1 and 2 and are tunable in accordance with known techniques.

Further, the dyes of this invention, some of which can be characterized as rigidized due to the structure which permits only one stereoisomer, exhibit high stability in solution. It is believed that the increased molecular rigidity of these dyes promotes the lasing ability. Also the rigidized structure appears to inhibit the formation of excited triplet states thereby permitting higher frequency pulsing of the dye solution whether flashlamp excited or excited by direct laser radiation and permits lower values of exciting energy to achieve lasing threshold.

The following are examples of dye lasers employing members of the hereinbefore described groups of benzopyrylium and pyrylium dyes.

EXAMPLE 1

A $10^{-3}$ molar solution of 4-(4-amyloxyphenyl)-2,6-bis(4-ethoxyphenyl)pyrylium perchlorate and dichloroethane was prepared. The solution was placed in a standard spectro absorption cell having an optical path length of 5 millimeters (FIG. 3). The cell is placed in the path of a focused laser beam ("pump") with the faces of the cell arranged at an angle with the pump. A ruby laser is used as the pump, coupled with a crystal of ammonium dihydrogen phosphate which generates second-harmonic light having a wave length of 347 nm. The pump emission is passed through a 30 centimeter lens with the dye cell situated 1 centimeter from the focus. Power density of the pump at the cell was approximately 30 megawatts per square centimeter, with a half-time-width of 15 nanoseconds. Two dielectric coated mirrors are used in the dye laser cavity, each placed 5 cm, from the dye cell. One mirror is provided with a radius of curvature of 18 cm. and a reflectivity of greater than 99 percent between 500 and 600 nm. The other mirror is flat with approximately 90 percent reflectivity in the same wavelength region. The dye laser cavity axis makes an angle of 25° with the pump axis. The wavelength of laser emission for this dye was measured using an Adam Hilger make spectroscope and recorded on a Polaroid (trademark of the Polaroid Company) equipped Graflex (trademark of the Graphflex Company) camera. Wavelength resolution was estimated to be ±3A°. The emission wavelength is reported in Table 1.

EXAMPLE 2

The ruby laser pump set up shown in FIG. 3 and described in Example 1 was used with a solution of 12, 1-3-dihydro-10-methoxy-dibenzo[a,h]xanthylium perchlorate in dichloroethane. The emission results are recorded in Table 1.

EXAMPLE 3

The ruby laser pump set up shown in FIG. 3 and described in Example 1 was used with a solution of 10-methoxy-12H-indeno[3,2-b]-naphtho[1,2-e]pyrylium perchlorate. The emission results are recorded in Table 1.

EXAMPLE 4

The ruby laser pump set up shown in FIG. 3 and described in Example 1 was used with a solution of 1,2-dihydro-4-methoxybenzo[C]-xanthylium perchlorate. The emission results are recorded in Table 1.

EXAMPLE 5

The ruby laser pump set up shown in FIG. 3 and described in Example 1 was used with a solution of 2-(4-methoxyphenyl)naphtho[2,1-b]-pyrylium perchlorate. The emission results are recorded in Table 1.

EXAMPLE 6

The ruby laser pump set up shown in FIG. 3 and described in Example 1 was used with a solution of Benzocyclohept[2,1-e]naphtho-[2,1-b]pyrylium perchlorate. The emission results are recorded in Table 1.

EXAMPLE 7

The ruby laser pump set up shown in FIG. 3 and described in Example 1 was used with a solution of 12H-Indeno [3,2-b]naphtho-[1,2-e]pyrylium perchlorate. The emission results are recorded in Table 1.

EXAMPLE 8

The ruby laser pump set up shown in FIG. 3 and described in Example 1 was used with a solution of 12,13-dihydrodibenzo[a,h]-xanthylium perchlorate. The emission results are recorded in Table 1.

EXAMPLE 9

The ruby laser pump set up shown in FIG. 3 and described in Example 1 was used with a solution of 8-methoxy-10H-indeno[2,3-e]-benzo[b]pyrylium perchlorate. The emission results are recorded in Table 1.

TABLE 1

| Example No. | Wavelengths of (nm) |
| --- | --- |
| 1 | 559 |
| 2 | 563 |
| 3 | 544 |
| 4 | 539 |
| 5 | 560 |
| 6 | 547 |
| 7 | 547 |
| 8 | 554 |
| 9 | 508 |

All dyes were found to lase with a wavelength bandwidth ranging between 20 and 35nm.

EXAMPLE 10

A solution of 12,13-dihydro-10-methoxy-dibenzo[a,h]-xanthylium perchlorate in dichloro ethane was prepared as in Example 2 and placed in a reservoir of a liquid laser disclosed within the thin-wall quartz cylinder described in FIGS. 1 and 2. The annular flashlamp region and the electrodes were operably connected to a low inductance capacitor charged by standard high voltage supply. In this example the dye solution was placed in a continual flow quartz cell, having an I.D. of 3mm. A diffuse reflector was used to surround the flashtube and dye cell. The electrical energy for the flashlamp was stored in a 1 uf capacitor with a maximum storage of 200 joules. The time to the peak of the flash output was 0.7 microseconds. The emission wavelength of the particular dye laser is reported in Table 2.

EXAMPLE 11

A solution of 10-methoxy-12H-indeno[3,2-b]naphtho [1,2-e]-pyrylium perchlorate was prepared as in Example 3 and pumped as in Example 10. The emission wavelengths obtained is reported in Table 2.

EXAMPLE 12

A solution of 1,2-dihydro-4-methoxybenzo[C]xanthylium perchlorate was prepared as in Example 3 and pumped as in Example 10. The emission wavelengths obtained is reported in Table 2.

TABLE 2

| Example No. | Concentration (mole/litre) | Wavelength (nm) |
| --- | --- | --- |
| 10 | $5.0 \times 10^{-4}$ | 547 |
| 11 | $3.3 \times 10^{-4}$ | 546 |
| 12 | $2.0 \times 10^{-4}$ | 542 |

In the practice of the present invention the solution in which the dyes are maintained is a matter of selection, no undue experimentation is necessary to determine operable lasing conditions. The pH of the solutions may be varied extensively within the fluorescing region particularly between the use of different solvent media.

In addition, dye concentration can advantageously be varied to adjust factors such as self-absorption, excitation absorption spectra, and the like. Generally, concentrations of from about $10^{-1}$ molar to $10^{-5}$ molar are useful for emission.

The invention has been described in considerable detail with particular reference to certain preferred embodiments thereof, but it will be understood that variations and modifications can be effected within the spirit and scope of the invention.

We claim:

1. A dye laser comprising a pumping energy source capable of producing stimulated emission of the dye solution and a laser cavity containing a dye cell capable of containing the laser dye solution as it is pumped, said dye solution comprising a sufficient concentration of a benzopyrylium dye in a noninterferring solvent for said dye to exhibit lasing activity.

2. A dye laser comprising a laser dye solution and a pumping energy source operably coupled therewith and capable of producing stimulated emission of the dye solution, said dye solution comprising a lasing concentration, in a non-interfering solvent, of a dye selected from the group consisting of pyrylium and benzopyrylium dyes having respectively the following general formulas:

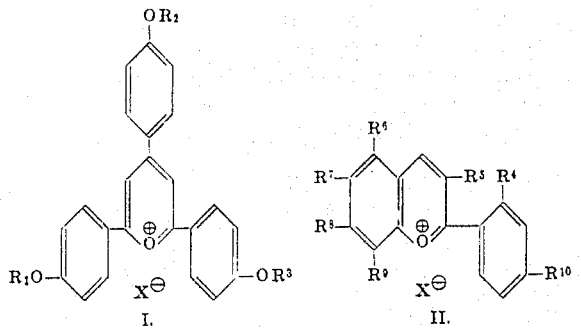

wherein each of $R^1$, $R^2$ and $R^3$ is an alkyl group having one to 12 carbon atoms, $R^4$ and $R^5$ are each hydrogen atoms, or taken together form a methylene chain having the structure $-(CH_2)-_n$, wherein $n$ is an integer from 1 to 4; each of $R^6$, $R^7$, $R^8$, and $R^9$ is a hydrogen atom or one of the pairs of groups $R^6$ and $R^7$, $R^7$ and $R^8$, or $R^8$ and $R^9$ is taken together form a 1,3-butadienylene group

, while the remaining $R^6$, $R^7$, $R^8$, and $R^9$ groups are hydrogen atoms; $R^{10}$ is a hydrogen atom, an alkoxy group having one to six carbon atoms, an alkyl group having one to 12 carbon atoms, or a dialkylamino group wherein each alkyl substituent of the dialkylamino group has one to four carbon atoms; and $X^\ominus$ is an acid anion.

3. A dye laser of claim 2 wherein the laser dye solution comprises 4-(4-amyloxyphenyl)-2,6-bis(4-ethoxyphenyl)-pyrylium perchlorate.

4. A dye laser of claim 2 wherein the laser dye solution comprises 12,13-dihydro-10-methoxy-dibenzo[a,h]xanthylium perchlorate.

5. A dye laser of claim 2 wherein the laser dye solution comprises 10-methoxy-12H-indeno[3,2-b]naphtho[1,2-e]-pyrylium perchlorate.

6. A dye laser of claim 2 wherein the laser dye solution comprises 1,2-dihydro-4-methoxybenzo[C]xanthylium perchlorate.

7. A dye laser of claim 2 wherein the laser dye solution comprises 2-(4-methoxyphenyl)naphtho[2,1-b]pyrylium perchlorate.

8. A dye laser of claim 2 wherein the laser dye solution comprises benzocyclohept[2,1-e]naphtho[2,1-b]pyrylium perchlorate.

9. A dye laser of claim 2 wherein the laser dye solution comprises 12H-indeno[3,2-b]naphtho[1,2-e]pyrylium perchlorate.

10. A dye laser of claim 2 wherein the laser dye solution comprises 12,13-dihydrodibenzo[a,h]xanthylium perchlorate.

11. A dye laser of claim 2 wherein the laser dye solution comprises 8-methoxy-10H-indeno[2,3-e]benzo[b]pyrylium perchlorate.

12. A method of producing coherent laser emission in the operation of a dye laser in the wavelengths of from about 500 nm to about 600 nm comprising the step of pumping a dye solution containing between $10^{-2}$ to $10^{-4}$ molar concentration of a dye in a noninterferring solvent, said dye selected from pyrlium and benzopyrylium dyes having the general formula

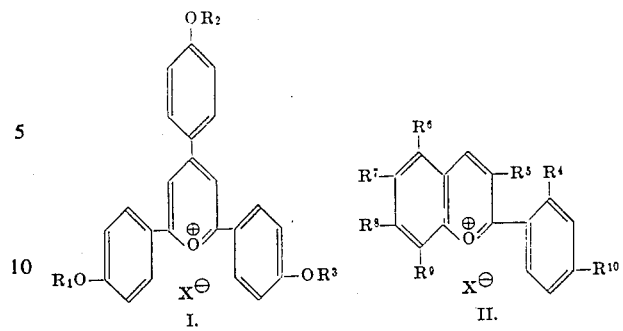

wherein each of $R^1$, $R^2$, and $R^3$ is an alkyl group having one to 12 carbon atoms, $R^4$ and $R^5$ are each hydrogen atoms, or taken together form a methylene chain having the structure $-(CH_2)-n$, wherein $n$ is an integer from 1 to 4; each of $R^6$, $R^7$, $R^8$, and $R^9$ is a hydrogen atom or one of the pairs of groups $R^6$ and $R^7$, $R^7$ and $R^8$, or $R^8$ and $R^9$ is taken together form a 1,3-butadienylene group

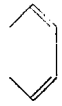

, while the remaining $R^6$, $R^7$, $R^8$, and $R^9$ groups are hydrogen atoms; $R^{10}$ is a hydrogen atom, an alkoxy group having one-six carbon atoms, an alkyl group having one-12 carbon atoms, or a dialkylamino group wherein each alkyl substituent of the dialkylamino group has one-four carbon atoms; and $X^\ominus$ is an acid anion.

13. A method of producing coherent laser emission in the operation of a dye laser in the wavelengths of from about 500 nm. to about 600 nm. comprising the step of pumping a dye solution containing between $10^{-2}$ to $10^{-4}$ molar concentration of a dye in a noninterfering solvent, said dye selected from benzopyrylium dyes having the general formula:

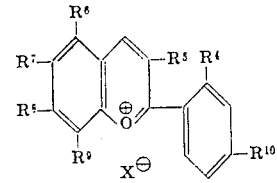

wherein $R^4$ and $R^5$ are each hydrogen atoms, or taken together form a methylene chain having the structure $-(CH_2)-_n$, wherein $n$ is an integer from one to four; each of $R^6$, $R^7$, $R^8$, and $R^9$ is a hydrogen atom or one of the pairs of groups $R^6$ and $R^7$, $R^7$ and $R^8$, or $R^8$ and $R^9$ is taken together form a 1,3-butadienylene group

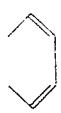

, while the remaining $R^6$, $R^7$, $R^8$, and $R^9$ groups are hydrogen atoms; $R^{10}$ is a hydrogen atom, an alkoxy group having one to six carbon atoms, an alkyl group having one to 12 carbon atoms, or a dialkylamino group wherein each alkyl substituent of the dialkylamino group has one to four carbon atoms; and $X^\ominus$ is an acid anion.

* * * * *